(12) United States Patent
Retardo et al.

(10) Patent No.: US 9,911,566 B2
(45) Date of Patent: Mar. 6, 2018

(54) FOAM FUSE FILLER AND CARTRIDGE FUSE

(71) Applicant: LITTELFUSE, INC., Chicago, IL (US)

(72) Inventors: Roel Retardo, Lipa (PH); Albert Enriquez, Lipa (PH)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 14/503,876

(22) Filed: Oct. 1, 2014

(65) Prior Publication Data

US 2015/0357143 A1 Dec. 10, 2015

Related U.S. Application Data

(60) Provisional application No. 61/893,086, filed on Oct. 18, 2013.

(51) Int. Cl.
| | | |
|---|---|---|
| *H01H 85/38* | (2006.01) | |
| *C08K 3/34* | (2006.01) | |
| *H01H 69/02* | (2006.01) | |
| *H01H 85/143* | (2006.01) | |
| *H01H 85/18* | (2006.01) | |

(52) U.S. Cl.
CPC ............... *H01H 85/38* (2013.01); *C08K 3/34* (2013.01); *H01H 69/02* (2013.01); *H01H 85/143* (2013.01); *H01H 85/18* (2013.01); *H01H 85/185* (2013.01); *H01H 2085/383* (2013.01); *H01H 2085/388* (2013.01); *Y10T 29/49108* (2015.01)

(58) Field of Classification Search
CPC ...... H01H 85/38; H01H 85/18; H01H 85/143; H01H 69/02; H01H 85/185; H01H 2085/388; H01H 2085/383; H01H 85/36; H01H 85/0069; H01H 2085/381; C08K 3/34; Y10T 29/49108
USPC ...... 337/231, 186, 208, 276; 29/623; 521/91
See application file for complete search history.

(56) References Cited

U.S. PATENT DOCUMENTS

| 769,995 | A | | 9/1904 | Feuerlein | |
|---|---|---|---|---|---|
| 3,761,660 | A | | 9/1973 | Jones | |
| 4,011,426 | A | * | 3/1977 | Lange | H01H 33/765 218/150 |
| 4,183,004 | A | | 1/1980 | Kozacka | |
| 4,709,222 | A | * | 11/1987 | Morita | H01H 85/0417 337/273 |
| 5,043,689 | A | * | 8/1991 | Di Troia | H01H 85/055 337/163 |
| 6,005,470 | A | * | 12/1999 | Smith | H01H 85/42 337/273 |

(Continued)

FOREIGN PATENT DOCUMENTS

WO 2009124974 A2 10/2009

OTHER PUBLICATIONS

European Search Report from corresponding European Patent Application No. 14187538.5 filed Oct. 2, 2014.

*Primary Examiner* — Stephen Sul

(57) ABSTRACT

Fuses having a melamine-coated-steatite foam filler are described. In particular, melamine-coated-steatite foam filler for use in a fuse comprising steatite coated in a melamine compound (e.g., plasticized melamine resin) and then heated to form crystalline foam filler are described. The foam filler may comprise steatite of substantially 3 times the melamine compound by weight and may be heated and then cooled to form the foam filler.

10 Claims, 4 Drawing Sheets

(56) References Cited

U.S. PATENT DOCUMENTS 6,586,361 B1 * 7/2003 Heidemann .............. B01J 23/22
502/209

* cited by examiner

FOAM FUSE FILLER AND CARTRIDGE FUSE

CROSS REFERENCE TO RELATED APPLICATIONS

This application claims the benefit of U.S. Provisional Patent Application Ser. No. 61/893,086 filed Oct. 18, 2013, entitled "Foam Fuse Filler and Cartridge Fuse," which application is incorporated herein by reference in its entirety.

FIELD OF THE DISCLOSURE

This disclosure relates generally to the field of fuses and more particularly to a fuse having an arc suppressing filler.

BACKGROUND OF THE DISCLOSURE

Fuses, which are commonly used as circuit protection devices, provide electrical connections between sources of electrical power and circuit components that are to be protected. One type of fuse includes a fusible element disposed within a hollow fuse body. Conductive terminals may be connected to each end of the fusible element through the fuse body to provide a means of connecting the fuse within a circuit.

Upon the occurrence of a specified fault condition in a circuit, such as an overcurrent condition, the fusible element of a fuse may melt or otherwise separate to interrupt current flow in the circuit path. Protected portions of the circuit are thereby electrically isolated and damage to such portions may be prevented or at least mitigated. However, after a fuse element melts, an electrical arc may form in an air gap between the newly separated ends of the fusible element. If not extinguished, this arc may cause further damage to the circuit by allowing unwanted current to flow to circuit components.

Additionally, the electrical arc may often cause the hollow fuse body to rupture, which may also cause damage to the circuit being protected and surrounding components.

Conventionally, the hollow fuse body is often filled with silica to assist in suppressing the electrical arc. Silica fillers, however, are required to be compacted in the hollow fuse body in order to provide adequate electrical arc quenching. Even where silica fillers are properly compacted, the silica may shift when the electrical arc burns (e.g., due to displacement forces created by the electrical arc, or the like). As a result, portions of the hollow fuse body may be exposed and the fuse body may rupture due to the electrical arc. Furthermore, fuses using conventional fillers often have lower breaking capacity (e.g., short circuit current ratings) and offer reduced overload protection than may be desired. For example, fuses where silica is used as the filler may not provide high enough breaking capacity due to poor silica compaction and may offer reduced overload protection due to a loss of functional energy (i.e., heat) to the high thermal conductivity filler material.

Thus, there is a need for low thermal conductivity fuse fillers that do not shift when an electrical arc burns. Additionally, there is a need for fuse fillers that provide increased breaking capacity and increased current overload protection.

SUMMARY

In accordance with the present disclosure, fuses having a melamine-coated-steatite foam filler are provided. Some embodiments provide a melamine-coated-steatite foam filler for use in a fuse comprising a melamine compound (e.g., plasticized melamine resin), and a steatite of substantially 3 times the melamine compound by weight, wherein the melamine compound and steatite are heated, for example, to between 50 and 250 degrees Celsius for between 1 and 900 minutes to form a foam filler for use in a fuse.

Some embodiments provide a fuse comprising a hollow body having a cavity therein, a fuse element disposed in the cavity, first and second end caps in electrical connection with the fuse element, and a melamine-coated-steatite foam (MC SF) filler disposed in the cavity around the fuse element, the MCSF filler comprising a melamine compound, and a steatite of substantially 3 times the melamine compound by weight, wherein the melamine compound and the steatite are heated to form a crystalline structure. In some example, the melamine compound and the steatite are heated to between 50 and 250 degrees Celsius for between 1 and 900 minutes to form the crystalline structure.

Some embodiments provide a method of making a fuse comprising inserting a fuse element into a cavity in a hollow fuse body, attaching a first end cap to the hollow fuse body and electrically connecting a first end of the fuse element to the first end cap, adding a steatite and melamine compound mixture to the cavity such that the steatite and melamine compound mixture are disposed around the fuse element, the steatite and melamine compound mixture comprising a melamine compound, and a steatite of substantially 3 times the melamine compound by weight, heating the hollow fuse body including the fuse element, the first end cap, and the steatite and melamine compound mixture to form a foam filler, and attaching a second end cap to the hollow fuse body and electrically connecting a second end of the fuse element to the second end cap. In some examples, the steatite and melamine compound mixture are heated to between 50 and 250 degrees Celsius for between 1 and 900 minutes.

BRIEF DESCRIPTION OF THE DRAWINGS

By way of example, specific embodiments of the disclosure will now be described, with reference to the accompanying drawings, in which.

DETAILED DESCRIPTION

Figure 1:
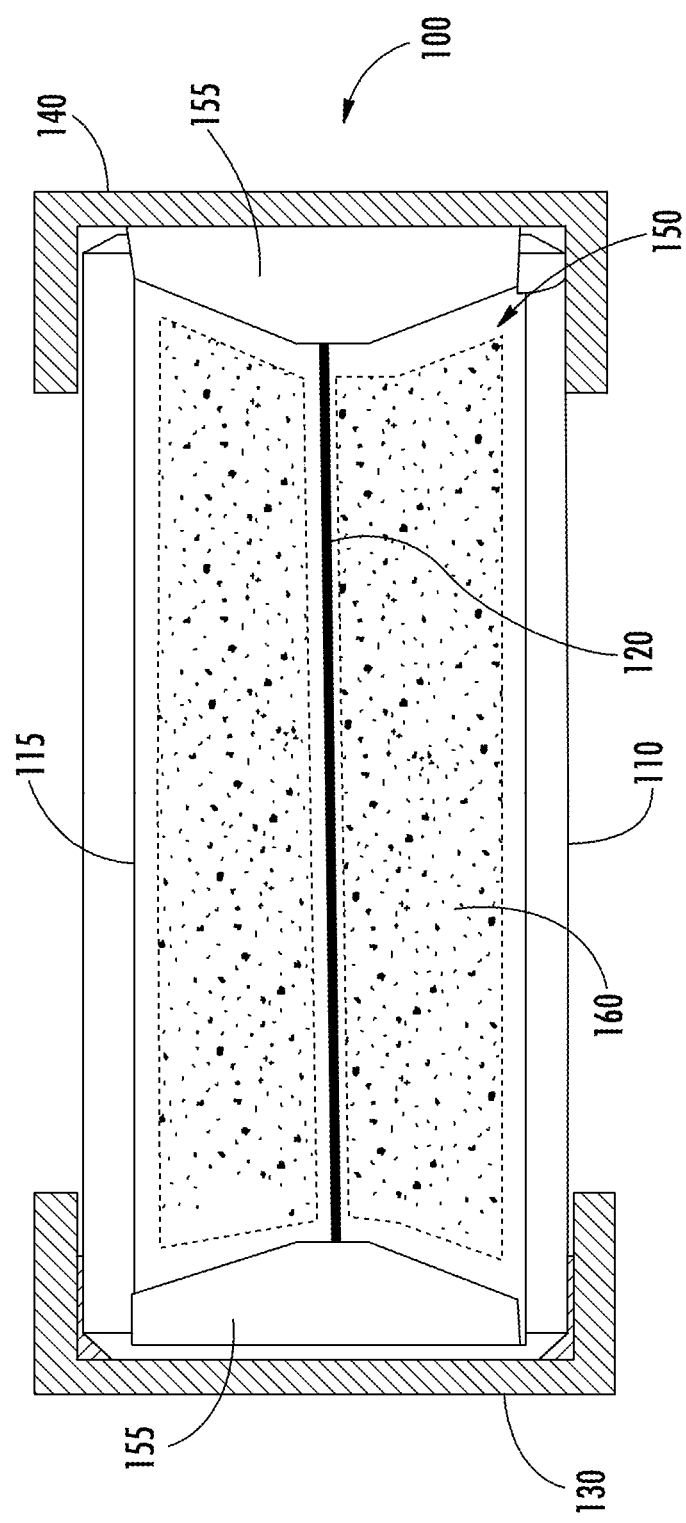
FIG. 1 illustrates a fuse having a melamine-coated-steatite foam filler.

FIG. 1 illustrates a side cut-away view of a fuse 100 having a hollow, tubular fuse body 110. In some examples, the fuse body 110 may be ceramic. The fuse 100 additionally includes a first end cap 130, a second end cap 140, and a fuse element 120 disposed within, and extending through, a cavity 150 of the hollow fuse body 110 to form an electrical connection between the end caps 130 and 140. The fuse element 120 is formed of an electrically conductive material having a melting point such that the desired fuse characteristics (e.g., current ratings, etc.) are satisfied. The end caps 130 and 140 are made from an electrically conductive material and fit over the longitudinal ends of the fuse body 110 to provide electrical contact with the fuse element 120. The fuse element 120 can be connected to the end caps 130 and 140 by a variety of techniques and/or materials. For example, the fuse element 120 is depicted connected to the end caps 130 and 140 by solder fillets 155, which are disposed at opposite ends of the fuse body 110.

The cavity 150, defined by an interior surface 115 of the fuse body 110, contains a melamine-coated-steatite foam (MCSF) filler 160 (described in greater detail below). When the fuse element 120 melts or separates due to a predetermined, excessive amount of current flowing through the fuse element 120, an electric arc forms between the un-melted portions of the fuse element. The electric arc grows in length as the separating portions of the fuse element 120 recede from each other until the voltage required to sustain the arc is higher than the available voltage in the protected circuit, thus terminating the current flow.

The MCSF filler 160 acts to suppress the electrical arc in the fuse 100 and to provide rigidity and burst protection characteristics to the fuse body 110. In particular, when heated (e.g., by the electrical arc) the MCSF filler 160 produces arc quenching gasses, such as, for example, formaldehyde, which act to reduce the time to suppress the electrical arc through deionization and arc cooling. Additionally, the MCSF filler 160 is bound together in a foam or crystalline structure. As such, in the presence of an electrical arc, the MCSF filler 160 may not shift and expose the fuse body 110. Therefore, the electrical arc may be contained within the MCSF structure thereby preventing rupture of the fuse body 110.

Figure 2:
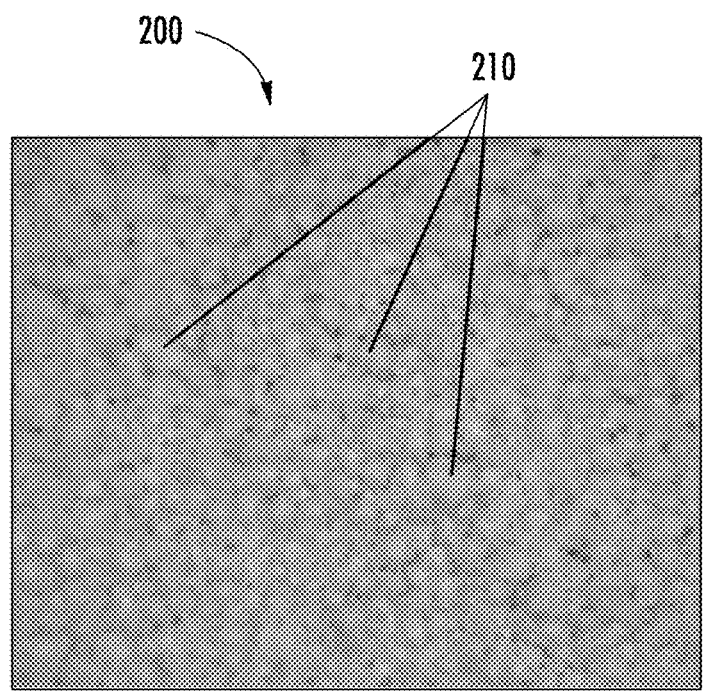
FIG. 2 illustrates a mixture of steatite and melamine compound.
Figure 3:
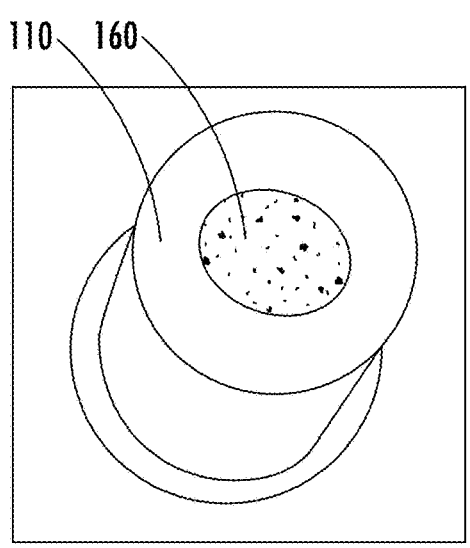
FIG. 3 illustrates a portion of the fuse of FIG. 1.

FIGS. 2-3 illustrate the MCSF filler 160 in greater detail. More particularly, FIG. 2 illustrates a mixture of steatite and melamine compound, which when heated, may form the MCSF filler 160, while FIG. 3 illustrates a top view of a fuse body having the MCSF filler 160 disposed therein.

Turning more specifically to FIG. 2, a mixture 200 is shown. The mixture 200 includes a variety of particles 210. Each of the particles 210 includes steatite (not shown) coated in a melamine compound (also not shown). In general, steatite is the crystalline form of magnesium silicate. In practice, the steatite in the mixture 200 may be any of a variety of types of steatite and/or steatite variations. As will be appreciated, steatite is an insulating material. In general, steatite is low loss, low cost, and can function safely at temperatures up to 2,000° F. In some examples, the melamine is a crystalline compound (C3H6N6) having the chemical structure of 2,4,6-triamino-1,3,5-triazine.

With some examples, the mixture 200 may include steatite (e.g., in powder form, or the like) mixed with a melamine compound (e.g., plasticized melamine resin, or the like). In some examples, the steatite and the melamine compound are mixed such that the grains of the steatite are coated in the melamine compound to form the particles 210. In various examples, the mixture 200 can include a selected ratio of steatite to melamine compound, by weight. In some examples, the ratio of steatite to melamine compound may be between 6:1 and 3:2 by weight. In some examples, the ratio of steatite to melamine compound will be greater than 2:1 by weight. In particular, with some examples, the ratio of steatite to melamine will be 3:1 by weight.

Said differently, in particular examples, for every part melamine compound in the mixture 200, the mixture 200 will also include 3 parts steatite, measured by weight. It is to be appreciated, that the example 3:1 ratio of steatite to melamine compound may be approximated. More specifically, the ratio need not be exactly 3:1 and instead, may be substantially or within reasonable tolerances of 3:1.

As detailed herein, the MCSF filler 160 is formed by filling the cavity 150 of the hollow fuse body 110 with the mixture 200. Said differently, the mixture 200 is added to the fuse body 110 and the cavity 150 is filled with the mixture 200 so that the mixture 200 surrounds the fuse element 120. The fuse body 110, the mixture 200, and the fuse element 120 may be heated to form the MCSF filler 160. In some examples, the ratio of steatite to melamine compound may be determined such that after the mixture is heated to form the MCSF filler 160, sufficient melamine compound remains (e.g., is not burned off during the heating process) to provide electric arc quenching properties as described herein. More specifically, sufficient melamine compound remains in the MCSF filler 160 such that during an arc suppression event, the melamine will burn and release gasses to quench the arc.

Turning more specifically to FIG. 3, a top down isometric view of the fuse 100 is shown. In this figure, the fuse body 110 and the MCSF filler 160 are shown. As indicated from FIG. 1, the MCSF filler 160 is formed around the fuse element 120 (not shown in FIG. 3). In particular, with some examples, heating the mixture 200 such that the mixture 200 crystalizes and forms the MCSF filler 160.

In some examples, the mixture 200 may be heated to between 50 and 250 degrees Celsius for between 1 and 900 minutes. In particular, with some examples, the mixture 200 may be heated to between 150 and 180 degrees Celsius and then cooled to room temperature (e.g., between 20 and 30 degrees Celsius). As the mixture 200 is heated, the melamine compound bonds to the steatite and forms a crystal structure as it cools, resulting in the MCSF filler 160. Said differently, as the mixture 200 is heated, the melamine compound softens and/or melts. When the mixture cools, the melamine compound and steatite form a crystal like structure. The MCSF filler 160, as stated above, provides improved electric arc quenching properties and provides a rigid structure in which the electric arc is contained such that the fuse 100 does not rupture and/or explode in high current conditions that would otherwise cause conventional fuses to rupture.

Figure 4:
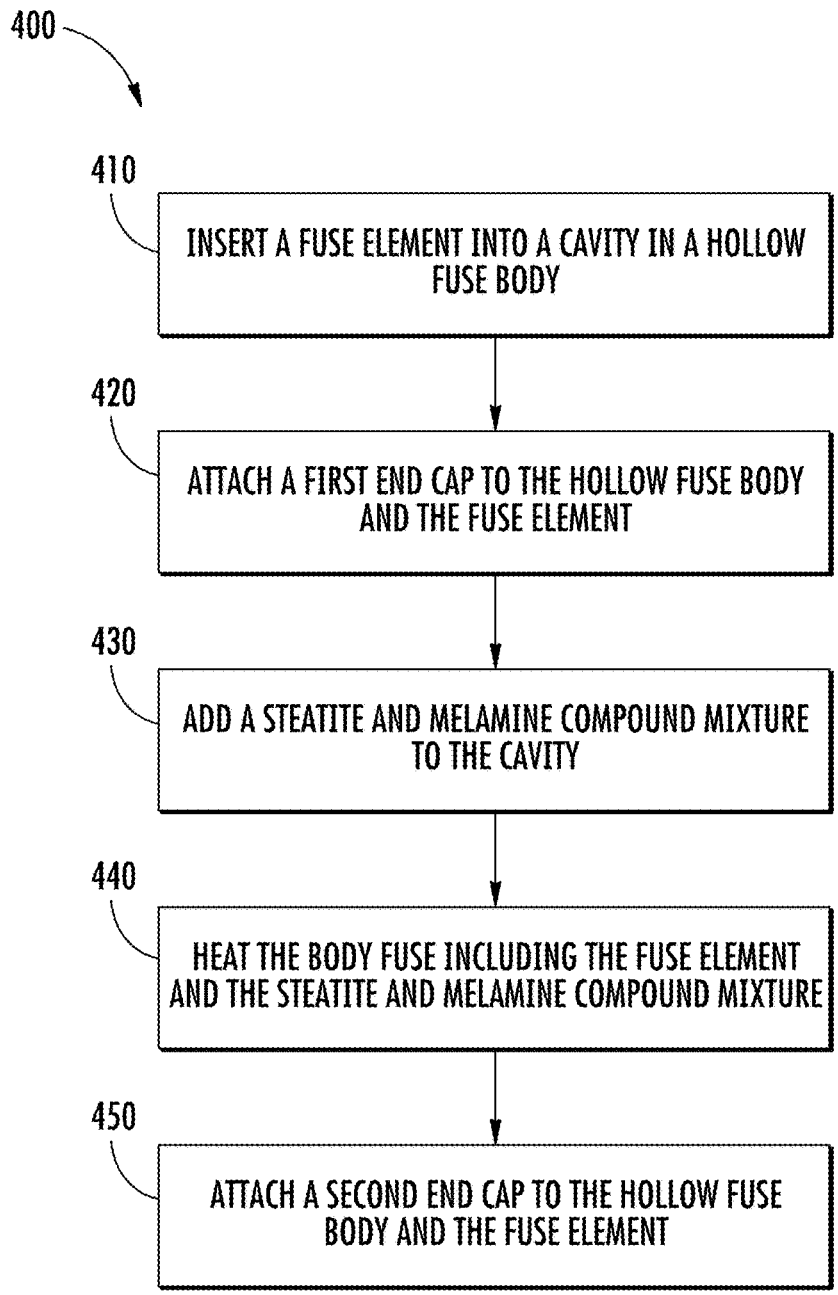
FIG. 4 is a flow chart of a method of forming a fuse including a melamine-coated-steatite foam filler.

FIG. 4 illustrates a method 400 for forming a fuse. The method 400 is discussed with reference to FIGS. 1-3. It will be appreciated, however, that this is done for purposes of illustration only and is not intended to be limiting. More specifically, the method 400 may be implemented to from a fuse different than that described and depicted with respect to FIGS. 1-3.

The method 400 may begin at block 410. At block 410, "insert a fuse element into a cavity in a hollow fuse body" the fuse element 120 may be inserted into the cavity 150 of the fuse body 110.

Continuing to block 420, "attach a first end cap to the hollow fuse body and the fuse element." At block 420, the end cap 130 may be attached to the fuse body 110 and a first end of the fuse element 120. For example, the solder 155 may be heated as the end cap 130 is pressed onto the fuse body 110 such that the fuse element is then soldered to the end cap 130.

Continuing to block 430, "add a steatite and melamine compound mixture to the cavity." At block 430, the mixture 200 is added to the cavity 150 such that the mixture 200 surrounds the fuse element 120. In some examples, the cavity 150 is substantially filled with the mixture 200. In some examples, the cavity 150 is partially filled with the mixture 200. As indicated above, the mixture 200 may have a varying ratio of steatite to melamine compound. In some examples, the ratio will be 3:1 (steatite to melamine compound) by weight.

Continuing to block 440, "heat the fuse body including the fuse element and the steatite and melamine compound mixture." At block 440, the fuse body 110, the fuse element 120, the mixture 200, and the end cap 130 are heated. In some examples, these components are heated to a temperature of between 50 and 250 degrees Celsius for between 1 and 900 minutes. As discussed, heating the mixture 200 (e.g., at block 440) forms the MCSF filler 160. In some examples, the mixture 200 expands while it is heated. In further examples, the amount the mixture expands depends upon the temperature, duration of heating, and/or the ratio of steatite to melamine compound. In some examples, block 440 may include heating the mixture 200 and cooling the mixture 200 to form the crystalline MCSF filler 160.

In some examples, the amount the cavity 150 is filled, the ratio of steatite to melamine compound, the temperature, and/or the duration of heating may be adjusted such that the MCSF filler 160 is formed substantially around the fuse element 120 but does not substantially overflow or expand out from the cavity 150 during the heating process. Furthermore, the heating process (e.g., at block 440) should be selected such that sufficient formaldehyde outgassing melamine compound remains after the heating process to provide the electric arc quenching and pressure suppressing properties discussed above.

Continuing to block 450, "attach a second end cap to the hollow fuse body and the fuse element." At block 450, the end cap 140 is attached to the fuse body 110 and a second end of the fuse element 120 (e.g., opposite the first end.) For example, the solder 155 may be heated as the end cap 140 is pressed onto the fuse body 110 such that the fuse element is then soldered to the end cap 130.

In some examples, blocks 430 and 450 may be performed concurrently. In other examples, the mixture 200 may be heated prior to one and/or both of the end caps (e.g., 130 or 140) being attached so that gasses resulting from the heating process may escape the cavity 150 prior to the MCSF filler 160 being sealed in the cavity and the fuse 100 being fully assembled.

Figure 5:
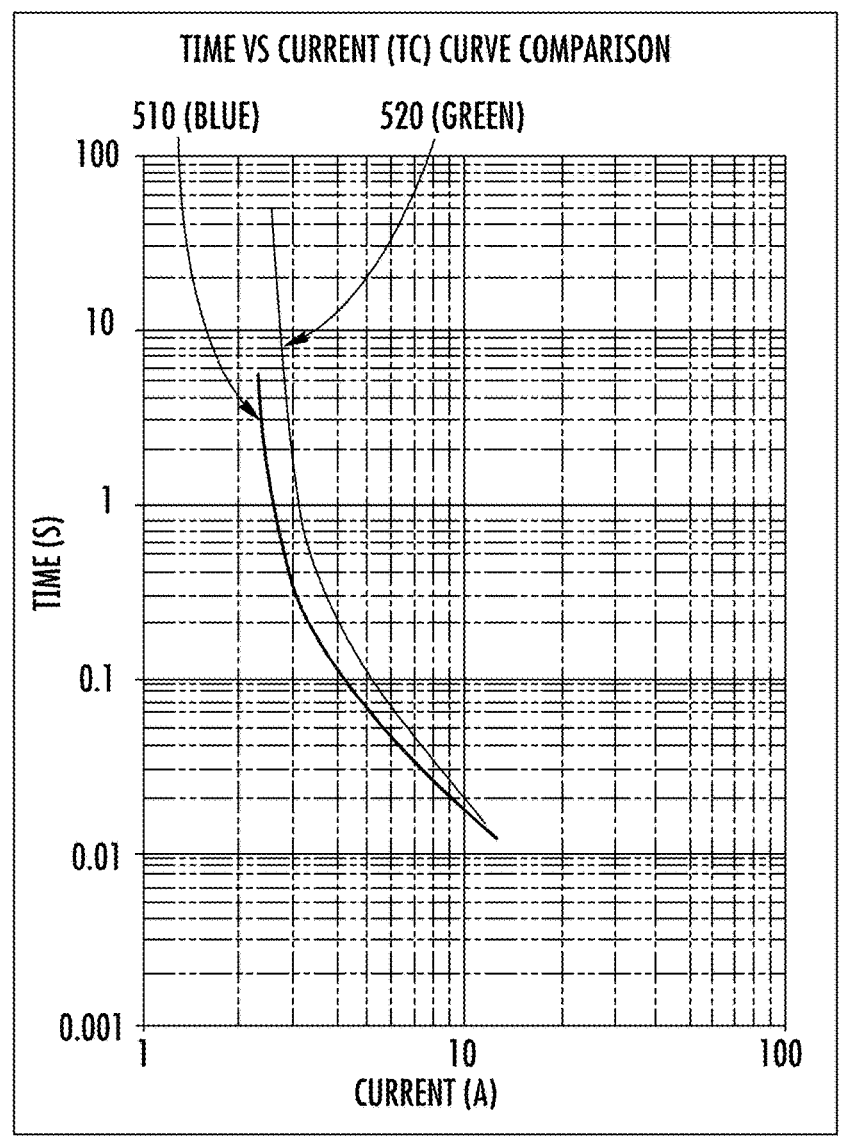
FIG. 5 is a graph illustrating characteristics of the fuse of FIG. 1 contrasted with a different fuse, all arranged in accordance with at least some embodiments of the present disclosure.

FIG. 5 is a graph 500 illustrating the time to open vs. current for two fuses formed according to the present disclosure. In particular, the graph 500 illustrates the time to open vs. current for fuses including an MCSF filler (e.g., the fuse 100). As stated above, some conventional fuses include silica as a filler. The present disclosure provides many advantages over conventional fillers. For example, melamine compound coated steatite has lower thermal conductivity than silica so fuses based on the present disclosure (e.g., the fuse 100) have reduced reaction time to overload conditions than conventional fuses. Said differently, the fuses provided herein will still open (e.g., the fuse element will melt and cause an open circuit) at low currents where conventional filled fuses would fail to open.

A first curve 510 is shown, which corresponds to the time to open vs. current for a fuse including an MCSF filler formed from a mixture of melamine compound and steatite. Additionally, a second curve 520 is shown, which corresponds to the time to open vs. current for a fuse having a filler formed from a mixture of melamine compound and silica. As can be seen, fuses having the MCSF filler (e.g., the fuse 100) open quicker than fuses using melamine-coated-silica filler. As will be appreciated, the time to open is an important characteristic of fuses as the time to open directly corresponds to the time required to quench the electric arc and also the amount of time the circuit to be protected is exposed to the high current.

Additionally, fuses of the present disclosure provide significantly higher breaking capacity than fuses having merely silica based fillers. For example, experiments were done on melamine-coated-silica filler fuses. The fuses of the present disclosure had a breaking capacity twice that of the melamine-coated-silica filler fuses. In one example, the melamine-coated-silica filled fuse had a breaking capacity of 100 Amps while a similar rated fuse but having a MCSF filler as disclosed herein had a breaking capacity of 200 Amps. As will be appreciated, this is a significant difference and shows one of the many advantageous of the present disclosure.

What is claimed is:

1. A melamine-coated-steatite foam filler for use in a fuse comprising:
   a mixture of particles, including:
   a melamine compound; and
   a steatite of at least 2 times the melamine compound by weight, wherein
   the mixture of particles is heatable such that the melamine compound is melted to bond to the steatite to form the melamine-coated-steatite foam filler, the melamine-coated-steatite foam filler having a rigid crystalline structure to contain an electric arc of the fuse.

2. The melamine-coated steatite foam filler of claim 1, comprising the steatite of substantially 3 times the melamine compound by weight.

3. The melamine-coated steatite foam filler of claim 1, wherein the melamine compound and the steatite are heated to form the melamine-coated-steatite foam filler crystalline structure in the fuse.

4. The melamine-coated-steatite foam filler of claim 3, wherein the melamine compound and the steatite are heated to between 50 and 250 degrees Celsius for between 1 and 900 minutes to form the foam filler.

5. The melamine-coated steatite foam filler of claim 1, wherein the melamine compound and the steatite are heated to between 150 and 180 degrees Celsius and cooled to room temperature to form the melamine-coated-steatite foam filler crystalline structure in the fuse.

6. A fuse comprising:
   a hollow body having a cavity therein;
   a fuse element disposed in the cavity;
   first and second end caps in electrical connection with the fuse element; and a melamine-coated-steatite foam (MCSF) filler disposed in the cavity around the fuse element, the MCSF filler comprising:
   a mixture of particles, including:
   a melamine compound; and
   a steatite of at least 2 times the melamine compound by weight, wherein the mixture of particles is heatable such that the melamine compound is melted to bond to the steatite to form the melamine-coated-steatite foam filler,
   the melamine-coated-steatite foam (MCSF) filler having a rigid crystalline structure configured to contain an electric arc of the fuse.

7. The fuse of claim 6, comprising the steatite of substantially 3 times the melamine compound by weight.

8. The fuse of claim 6, wherein the melamine compound and the steatite are heated to form the melamine-coated-steatite foam filler crystalline structure filler.

9. The fuse of claim 8, wherein the melamine compound and the steatite are heated to between 50 and 250 degrees Celsius for between 1 and 900 minutes to form the melamine-coated-steatite foam filler crystalline structure filler.

10. The fuse of claim 6, wherein the melamine compound and the steatite are heated to between 150 and 180 degrees Celsius and cooled to room temperature to form the melamine-coated-steatite foam filler crystalline structure filler.

\* \* \* \* \*